US012460153B2

(12) United States Patent
Zhiri et al.

(10) Patent No.: US 12,460,153 B2
(45) Date of Patent: Nov. 4, 2025

(54) METHOD FOR TRANSFORMING AN ESSENTIAL OIL

(71) Applicants: PRANAROM INTERNATIONAL S.A., Ghislenghien (BE); UNIVERSITE LIBRE DE BRUXELLES, Brussels (BE); UNIVERSITE GRENOBLE ALPES, Saint Martin d'Heres (FR); CENTRE NATIONAL DE LA RECHERCHE SCIENTIFIQUE, Paris (FR)

(72) Inventors: Abdesselam Zhiri, Sint-Pieters-Leeuw (BE); Sofia Oliveira Ribeiro, Anderlecht (BE); Caroline Stevigny, Hoeilaart (BE); Florence Souard, Anglet (FR); Dominique Baudoux, Saintes (BE)

(73) Assignees: Pranarom International S.A., Ghislenghien (BE); Universite Libre De Bruxelles, Brussels (BE); Universite Grenoble Alpes, Saint Martin d'Heres (FR); Centre National De La Recherche Scientifique, Paris (FR)

( * ) Notice: Subject to any disclaimer, the term of this patent is extended or adjusted under 35 U.S.C. 154(b) by 749 days.

(21) Appl. No.: 17/781,958

(22) PCT Filed: Dec. 4, 2020

(86) PCT No.: PCT/EP2020/084631
§ 371 (c)(1),
(2) Date: Jun. 2, 2022

(87) PCT Pub. No.: WO2021/110915
PCT Pub. Date: Jun. 10, 2021

(65) Prior Publication Data
US 2022/0315860 A1    Oct. 6, 2022

(30) Foreign Application Priority Data
Dec. 4, 2019  (EP) .................................... 19306569

(51) Int. Cl.
*C11B 9/02* (2006.01)
*A61K 36/28* (2006.01)
*A61K 45/06* (2006.01)

(52) U.S. Cl.
CPC .............. *C11B 9/027* (2013.01); *A61K 36/28* (2013.01); *A61K 45/06* (2013.01)

(58) Field of Classification Search
CPC ........ A61K 36/54; A61K 36/61; A61K 36/28; A61K 36/899; A61K 36/23; A61K 31/43; A61K 45/06; A61K 2300/00; A61K 2236/37; A61K 2236/39; A61K 2236/51; A61K 2236/33; A61K 2236/35; A61P 31/10; A61P 31/04; C11B 9/027
USPC ........................................................ 512/5, 1
See application file for complete search history.

(56) References Cited

FOREIGN PATENT DOCUMENTS

| CN | 108865441 A | * | 11/2018 | |
| CN | 109679767 A | | 4/2019 | |
| FR | 2918571 A1 | | 1/2009 | |
| WO | WO-0115680 A1 | * | 3/2001 | ............. A61K 31/05 |
| WO | 2012023146 A1 | | 2/2012 | |
| WO | 2012114201 A1 | | 8/2012 | |

OTHER PUBLICATIONS

Zhao et al., CN 108865441 Machine Translation, Nov. 23, 2018 (Year: 2018).*
Gradinaru AC et al. "Antibacterial activity of traditional spices against lower respiratory tract pathogens: combinatorial effects of Trachyspermum ammi essential oil with conventional antibiotics" Letters in Applied Microbiology, vol. 67, No. 5, Nov. 2018 pp. 449-457.
Ez Zoubi Yet al. "The antimicrobial activity of moroccan lavaender esssentiel oil against bacterial pathogens Isolated urinary tract infectious", International Journal of Pharmaceutical and Clinical Research, vol. 8, No. 11, Nov. 1, 2016, pp. 1522-1527.
Julien Sfeir et al. "In Vitro Antibacterial Activity of Essential Oils against Streptococcus pyogenes" Evidence- Based Complementary and Alternative Medicine, US, vol. 2013, Jan. 1, 2013, pp. 1-9.
Tariq Saika et al. "A comprehensive review of the antibacterial, antifungal and antiviral potential of essential oils and their chemical constituents against drug-resistant microbial pathogens" Microbial Pathogenesis Academic Press Limited, New York, NY, US, vol. 134, Jun. 11, 2019.
Sara A. Burt et al. "Increase in Activity of Essential Oil Components Carvacrol and Thymol against *Escherichia coli* O157:H7 by Addition of Food Stabilizers" Journal of Food Protection, US, vol. 68, No. 5, May 1, 2005 pp. 919-926.

* cited by examiner

Primary Examiner — Jessica Whiteley
(74) Attorney, Agent, or Firm — FISHERBROYLES, LLP; Roger L. Browdy

(57) ABSTRACT

The invention relates to a method for transforming an essential oil, an essential oil fraction obtained in said manner, combinations comprising the essential fraction obtained in said manner and an antibiotic or an antifungal, and the use thereof as a medicament, in particular the use thereof in the prevention or treatment of infectious bacterial or fungal diseases.

14 Claims, No Drawings

METHOD FOR TRANSFORMING AN ESSENTIAL OIL

TECHNICAL DOMAIN

This invention provides a method for transforming an essential oil (EO), the essential oil fraction obtained in such manner, and the use thereof as medicament, in particular its use in the prevention or treatment of infectious bacterial or fungal diseases, this invention further provides combinations comprising the essential oil fraction obtained according to the method of this invention with an antibiotic or an antifungal and the uses of these combinations as medicament, in particular their use in the prevention or treatment of infectious bacterial or fungal diseases.

TECHNICAL BACKGROUND

According to the European and French Pharmacopoeias, an essential oil (EO) is defined as an "odorous product, usually of complex composition, obtained from a botanically defined plant raw material by steam distillation, dry distillation, or a suitable mechanical process without heating. The EO is usually separated from the aqueous phase by physical means not entailing any significant change to its composition".

This definition is also adopted by AFNOR (Association Frartgaise de Normalisation) and ISO (International Organization for Standardization) standards, and by the ANSM (Agence National de Securitel du Medicament et des produits de sante) and the international authorities.

Most essential oils are obtained by steam distillation. This method is the most widespread by far, because it is suitable for the majority of plants and it is the method validated by the majority of pharmacopoeias. The aim is to take away the most volatile constituents with the steam. The steam destroys the structure of the plant cells, releases the molecules contained, and carries the most volatile molecules by separating them from the cellulosic substrate. The steam, charged with the essence of the distilled raw material, condenses in the coolant of a still before being recovered in a decantation vessel. The parts not soluble in the water condensation are decanted to obtain the essential oil.

The plant kingdom has several hundreds of thousands of species, and 4,000 of these produce aromatic essences; only a few hundred of which in sufficient quantity to extract them.

It is legally allowed to keep essential oils for a duration of 5 years. Furthermore, essences obtained by cold citrus expression are only kept for 3 years.

Essential oils can be used internally, externally or by air. Administered internally, essential oils are sometimes irritants to the mucous membranes; they are generally mixed with vegetable oil, honey, breadcrumbs or a neutral medium because they do not dilute in water, in pharmacy, it is possible to buy gel capsule type preparations (with a vegetable oil base and gastro-resistant capsules) and preparations in the form of capsules and suppositories. The vegetable oil or the essential oil can penetrate the body through the skin (externally). In this case, it is then mixed with a vegetable massage oil or a wax, an ointment, a cream or a body milk. Lastly, wet or dry diffusion of essential oils in the air is also used.

An essential oil can contain up to several hundred different molecules, many of which have special properties. For example, the essential oil of clary sage (*Salvia sclarea*) generally contains 250 different molecules. These molecules are grouped into several "biochemical families": ketones, acids, aldehydes, alcohols, esters, ethers, sesquiterpenes, monoterpenes, aromatic oxides, hydrocarbons, phenols. This chemical "identity card" of the essential oil is the reflection of its properties and differs according to its species or sub-species, its geographic origin, its producing organ, the nature of the soil, the altitude, the duration of sun exposure, and its plant environment. Many essential oils have different chemotypes.

The use of essential oils for therapeutic purposes is called aromatherapy. This is a field of phytotherapy which is expanding in the health sector as complementary therapy. Essential oils have already demonstrated, often in vitro, antiseptic, antibacterial, immunostimulant, decongestive, calming, antispasmodic, stimulant or anti-inflammatory effects.

The antibacterial action (individual or individual) of essential oils represents a particularly well researched interest given the major public health problem of antibiotic resistance. Antibiotics made it possible to considerably reduce the mortality associated with infectious diseases during the $20^{th}$ century. The remarkable effectiveness of antibiotics led to their massive and repeated use in human and animal health. However, their massive and repeated use has led to the appearance of resistant bacterial strains. Isolated in the beginning, these resistances have become massive and worrying. Some strains are multi-resistant, i.e. resistant to several antibiotics, of a same family or different families. This phenomenon, constantly increasing, puts health experts in a therapeutic dead end: they no longer have solutions to combat infection.

It is known in the state of the art that EOs have antibacterial properties. For example, document DE202007015195U1 discloses that linalool, a compound of coriander essential oil separated by column chromatography after an extraction by steam distillation from seeds, has an antimicrobial activity against *S. aureus* (individual activity) and also anti-inflammatory properties.

The association of essential oil compounds with an antibiotic also seems to have a certain interest because some of these compounds would make it possible to sensitise antibiotic-resistant bacterial strains. For example, document WO2006/120494A1 assessed the sensitivity of *K. pneumoniae* to amoxicillin using carveol. The results reveal that the mice treated with carveol alone had a percentage of survival similar to the untreated mice and the mice treated only with amoxicillin. However, the combination of carveol and amoxicillin protects the treated mice. According to this document, the carveol can derive from an essential oil or be synthesised chemically.

Similarly, document WO2017/209588A2 discloses a pharmaceutical compound comprising 1,8-cineole and amoxicillin, According to this document, the 1,8-cineole potentiates the effect of the amoxicillin and sensitises the bacterial strains *E. coli* and *K. pneumoniae*, initially resistant. The cineole used in document WO2017/209588A2 is commercial cineole. This document mentions that the cineole can be extracted from some varieties of *eucalyptus*, rosemary, mugwort, absinth, laurel, sage, basil and camphor.

Unfortunately, the essential oil-based antibacterial compounds currently in existence, and particularly the antibacterial compounds of documents DE202007015195U1, WO2006/120494A1 and WO2017/209588A2, present limitations. In particular, it is still necessary to increase the antimicrobial activity of the essential oil-based compounds against an acceptable number of bacterial and fungal strains. Furthermore, it is also necessary to develop new essential oil-based compounds which make it possible to further increase the potentiating effect of antimicrobial agents, such as antibiotics or antifungals.

DESCRIPTION OF THE INVENTION

The invention makes it possible to resolve the drawbacks of the state of the art by procuring a method for transforming an essential oil which leads to obtaining a transformed essential oil corresponding to the unevaporated essential oil fraction. The essential oil transformed by the method according to the invention has an enhanced antibacterial action in comparison to a non-transformed essential oil, has an individual activity and a combinatorial activity (in association with various antibiotics), and has a broad-spectrum antibacterial action, and also antifungal.

To solve this problem, the invention provides a method for transforming an essential oil comprising:
  providing a previously extracted essential oil;
  evaporating a fraction of between 7 and 90% of the essential oil; and
  obtaining a transformed essential oil comprising the recovery of the unevaporated essential oil fraction,
characterised in that the evaporation is undertaken for at least 2 hours, under pressure less than or equal to 500 mbar, and at a temperature between 40 and 100 CC.

In a preferred embodiment of the invention, an EO makes reference to an EO as defined according to the French and European pharmacopoeias, which is defined as on odorous product, usually of complex composition, obtained from a botanically defined plant raw material by steam distillation, dry distillation, or a suitable mechanical process without heating. The EO is usually separated from the aqueous phase by physical means not entailing any significant change to its composition.

According to one particular embodiment of the invention, the EO is an odorous product obtained from a botanically defined plant raw material by steam distillation, dry distillation, or a suitable mechanical process without heating. Preferably, the EO according to the invention is obtained by steam distillation.

Preferably, the EO according to the invention is not obtained by a method other than distillation or cold pressing, for example, is not obtained by solvent extraction, by supercritical fluid extraction, by double distillation, or by simultaneous distillation and extraction.

Within the framework of this invention, all quantities defined as percentages (%) make reference to volume percentages (% volume, % volume/volume, % v/v), unless the context clearly indicates otherwise. It will therefore be clear for example for the skilled person that the evaporation of 7% EO means that 7% of the initial volume of Et) has evaporated, while 93% of the initial volume of EC) has not evaporated. Still according to this example, the transformed EO obtained by the method according to the invention corresponds to the fraction of the EO which has not evaporated, specifically 93% of the initial volume of EQ. Similarly, the evaporation of 90% of the EC) means that 90% of the initial volume of EO has evaporated, while 10% of the initial volume of EO has not evaporated. Still according to this example, the transformed EO obtained by the method according to the invention therefore corresponds to the fraction of the EO which has not evaporated, specifically 10% of the initial volume of EO.

The inventors surprisingly observed that the method according to the invention made it possible to obtain a transformed essential oil which has an enhanced antibacterial and antifungal activity. Furthermore, the essential oil transformed by the method according to the invention can be used alone or in combination with an antibiotic, and is effective against different bacterial and fungal types.

Within the framework of this invention, the individual activity makes reference to the antimicrobial activity exerted by the EO itself. The individual activity may, for example, be evaluated simply by measuring the MIC (minimum inhibitory concentration), which is the lowest concentration sufficient to inhibit, in vitro, the growth of a bacterial strain, after treating different bacterial strains by different EOs transformed or not according to the method of the invention.

It was observed that the EOs transformed according to the method of the invention have an enhanced individual activity, namely a reduction in the MIC, on different bacterial strains, in comparison to an EO not transformed according to the method of the invention. For example, the EO of ajowan and the EO of French lavender transformed according to the method of the invention present an activity at least twice as high on at least 3 bacterial strains.

The combinatorial activity makes reference to the synergetic interaction observed between the transformed EO and an antimicrobial agent (which is not part of the essential oil). The combinatorial activity can be evaluated by the microdilution method, for example, by a method of microdilution on a tray of 96 wells where the products alone and/or combined are diluted by half, from an initial concentration of around 1000 µg/ml. The MIC is determined from this method. An improvement in activity is observed when the MIC of the association of an antibiotic with the essential oil, transformed or not, is less than that of the antibiotic alone. For example, if the MIC of the antibiotic alone is 4 µg/ml and the value obtained in combinatorial activity is 0.5 µg/ml, there is an improvement in the activity of 8× the activity of the antibiotic alone. The greater the reduction in MIC, the lower the necessary concentration of antibiotic when it is combined with the EQ. The lower the MIC, the more the activity of the antibiotic against the bacterial strain is potentiated. In reducing the concentrations of essential oils below its MIC it is likely that we will have non-toxic values.

In particular, the inventors observed an improved combinatorial activity, namely a reduction in the MIC observed with the association when compared with that observed with the antibiotic alone, when the bacteria are treated with different EOs transformed according to the method of the invention, as an example, the DO of ajowan (*Trachyspermum ammi*), the EO of German chamomile (*Matricaria recutita*), the EC) of lemongrass (*Cymbopogan citrates*) and the EO of French lavender (*Lavandula stoechos*) sensitise 3 bacterial strains normally resistant to several antibiotics, when they are transformed according to the method of the invention.

Preferably, the evaporation is between 10 and 90%, preferably between 20 and 75%, further preferably between 20 and 50%, even further preferably between 30 and 50%, for example around 45% of the essential oil. Indeed, it was observed that the individual and combinatorial activity was increasingly enhanced according to the percentage of evaporation of the EC) transformed according to the method of the invention, for example, in combinatorial activity with Penicillin V, the EC) of compact marjoram (*Origonum compoctum*) transformed according to the method of the invention on the strain *S. aureus* LMG 15975, an MIC of 0.125 for an evaporation of around 16% and reduced to an MIC of 0.03 µg/ml for an evaporation of around 27.5%. In individual activity, in the case of an EC) of French lavender transformed according to the invention, the MICs calculated for the strain *S. aureus* LMG 8064 reduce between the EO not transformed and transformed according to the invention, but also reduce again by half when the evaporation increases from 19 to 24%, and by a half again when the evaporation increases from 24 to 41.5%.

In a preferred embodiment of the invention, the method according to the invention comprises the steps to provide a previously extracted essential oil, evaporate between 10 and 90% of the essential oil, and obtain a transformed essential oil comprising the recovery of the unevaporated essential oil fraction. Further preferably, the method according to the invention comprises the steps to provide a previously extracted essential oil, evaporate between 20 and 75% of the essential oil; and obtain a transformed essential oil comprising the recovery of the unevaporated essential oil fraction. Even further preferably, the method according to the invention comprises the steps to provide a previously extracted essential oil, evaporate between 20 and 50% of the essential oil, and obtain a transformed essential oil comprising the recovery of the unevaporated essential oil fraction. Most preferably, the method according to the invention comprises the steps to provide a previously extracted essential oil, evaporate between 30 and 50% of the essential oil; and obtain a transformed essential oil comprising the recovery of the unevaporated essential oil fraction. For example, the method according to the invention comprises the steps to provide a previously extracted essential oil, evaporate around 45% of the essential oil, and obtain a transformed essential oil comprising the recovery of the unevaporated essential oil fraction.

Advantageously, the evaporation is undertaken for a duration between 2 and 360 hours, preferably between 2 and 240 hours, by preference between 3 and 96 hours, further preferably between 18 and 96 hours, even further preferably between 24 and 96 hours, for example for a duration of around 72 hours. The percentage of evaporation will notably depend on the duration of evaporation and the volatility of each EO studied. For example, for an EO with low volatility, like the EO of palmarosa (*Cymbopogon martinii* var. *matia*), a reduction of the MIC is already observed after 3 hours.

In a particular method of the invention, the evaporation is undertaken under a pressure less than or equal to 300 mbar, preferably less than or equal to 150 mbar, further preferably less than or equal to 100 mbar, even further preferably between 25 and 75 mbar, for example around 60 mbar.

By preference, the evaporation is undertaken at a temperature between 30 and 100° C., preferably between 30 and 70° C., by preference between 35 and 60° C., further preferably between 40 and 60° C., for example at a temperature of around 40° C.

Advantageously, the evaporation is between 7 and 90% and is undertaken for a duration between 24 and 96 hours, under a pressure between 25 and 75 mbar, at a temperature between 35 and 60° C. By preference the evaporation is between 10 and 90% and is undertaken for a duration between 24 and 96 hours, under a pressure between 25 and 75 mbar, at a temperature between 35 and 60° C. Preferably the evaporation is between 20 and 75% and is undertaken for a duration between 24 and 96 hours, under a pressure between 25 and 75 mbar, at a temperature between 35 and 60° C. Further preferably, the evaporation is between 20 and 50% and is undertaken for a duration between 24 and 96 hours, under a pressure between 25 and 75 mbar, at a temperature between 35 and 60° C. Even further preferably, the evaporation is between 30 and 50% and is undertaken for a duration between 24 and 96 hours, under a pressure between 25 and 75 mbar, at a temperature between 35 and 60° C.

According to a preferred method of the invention, the previously extracted essential oil is evaporated in the presence of a solution comprising a solvent chosen from among hydrocarbons such as chloroform, dichloromethane, n-hexane, cyclohexane or petroleum ether; ethers such as diethyl ether; esters such as ethyl acetate; ketones such as acetone; alcohols such as methanol, ethanol or isopropanol; and their blends. According to this particular method of the invention, the solution comprising the solvent assists the evaporation of the EO, It is added before the evaporation and is pretty much completely evaporated during the evaporation of an EO fraction.

Preferably, the solution comprising a solvent is a hydroalcoholic blend, with the alcohol being present at a level of at least 50%.

Advantageously, the evaporation is undertaken under agitation, preferably under agitation between 20 and 300 rotations/minute, preferably between 200 and 300 rotations/minute.

In a preferred embodiment of the invention, the essential oil is previously extracted from a plant selected from the group comprising ajowan (*Trachyspermum ammi*), basil, for example exotic basil (*Ocimum basilicum* ssp *basilicum*), chamomile, for example German chamomile (*Matricoria recutita*), cinnamon, for example Chinese cinnamon (*Cinnamomum cassia*), coriander, for example coriander leaf (*Coriandrum sativum*), clove (*Eugenia caryophyllus*), lavender, for example French lavender (*Lavandula stoechas*), lemongrass (*Cymbopogon citrates*), marjoram, for example compact marjoram (*Origanum compactum*) palmarosa (*Cymbopogon martinii* var. *motio*), and their blends.

In a particular embodiment, the chamomile is German chamomile, the cinnamon is Chinese cinnamon, and the lavender is French lavender.

In a preferred embodiment of the invention, the essential oil is previously extracted from the French lavender or the compact marjoram, preferably the essential oil is previously extracted from French lavender. Indeed, the inventors observed that the antibacterial action was particularly effective when the plant from which the EO was extracted then transformed according to the method of the invention was compact marjoram or French lavender, with the results being even better with the French lavender.

Preferably, the essential oil is previously extracted from French lavender and the evaporation is undertaken for a duration between 24 and 96 hours, under a pressure between 25 and 75 mbar, at a temperature between 40 and 60'C. The inventors indeed observed that the antibacterial action was particularly enhanced when the EO was extracted from French lavender and transformed according to the method of the invention under these particular parameters.

Another subject matter of the invention is an essential oil fraction susceptible to be obtained by the method of transformation according to the invention. The essential oil fraction according to the invention corresponds to the unevaporated essential oil fraction obtained by a transformation according to the method of the invention. The EO is first previously extracted. The methods of extraction of the EO can be all methods of EO extraction known to the skilled person. Preferably, the methods of EO extraction are those that make it possible to obtain an EO as defined in the French and European pharmacopoeias, namely by steam distillation, dry distillation, or a suitable mechanical process without heating. In particular, the EO is extracted by steam distillation. Once the EO is extracted, an evaporation of a fraction between 7 and 90% of the EO is undertaken for at least 2 hours, under a pressure less than or equal to 500 mbar, and at a temperature between 40 and 100° C. The essential EO thus transformed comprises the unevaporated EO fraction.

The evaporated EO fraction corresponds to a percentage between 7 and 90% of the EO and the Et) fraction according to the invention, specifically the unevaporated EO fraction obtained by the method according to the invention, corresponds to a percentage between 10 and 93% of the extracted EO. An EO fraction according to the invention, specifically the unevaporated EO fraction corresponding to a percentage between 10 and 93% of the EO, possesses an individual and/or combinatorial activity which is enhanced.

Preferably, the unevaporated EO fraction according to the invention corresponds to a percentage between 10 and 90%, preferably between 25 and 80%, further preferably between 50 and 80%, even further preferably between 50 and 70%, most preferably around 55% of the EO. Indeed, it has been observed that the unevaporated EO fraction according to the invention has an antibacterial activity which improves proportionally with the reduction in the percentage of the unevaporated EO fraction according to the invention.

In a preferred embodiment of the invention, the unevaporated EO fraction according to the invention derives from a plant selected from the group comprising ajowan, basil, chamomile, cinnamon, coriander, clove, lavender, lemongrass, marjoram, palmarosa, and their blends.

In a particular embodiment, the chamomile is German chamomile, the cinnamon is Chinese cinnamon, and the lavender is French lavender.

In a preferred embodiment of the invention, the unevaporated EO fraction according to the invention is obtained from an essential oil previously extracted from French lavender or compact marjoram, preferably the essential oil is previously extracted from French lavender. Indeed, the inventors observed that the antibacterial action was particularly effective when the unevaporated EO fraction according to the invention was transformed from an EO extracted from compact marjoram or French lavender, with the results being even better with French lavender.

Preferably, the unevaporated EO fraction according to the invention is transformed from an essential oil which is previously extracted from French lavender, the transformation comprising an evaporation for a duration between 24 and 96 hours, under a pressure between 25 and 75 mbar, and at a temperature between 40 and 60° C. The inventors effectively observed that the antibacterial action was particularly improved with such unevaporated EO fraction according to the invention.

Another subject matter of the invention is also a combination comprising an essential oil fraction according to the invention and a second essential oil which has been transformed or not by the method according to the invention.

Another subject matter of the invention is also a combination comprising an essential oil fraction according to the invention and at least one antifungal. The antifungal may, for example, be nystatin and fluconazole. The inventors observed an enhanced combinatorial activity, specifically a reduction of the MIC of the combination of the antifungal with the unevaporated EO fraction according to the invention, in comparison to the MC of the antifungal alone.

Another aspect of the invention is a combination comprising an essential oil fraction according to the invention and at least one antibiotic.

Preferably, the antibiotic is selected from the group comprising beta-lactams, tetracyclines, aminoglycosides, phosphonic acid antibiotics, macrolides, quinolones, etc. and their blends.

It was observed that the combinatorial activity was enhanced, i.e. a reduction in the MIC of the association of an antibiotic with the unevaporated EC) fraction according to the invention was observed in comparison to the MIC of the antibiotic alone.

Preferably, the essential oil is previously extracted from French lavender and the antibiotic is a penicillin. The antibacterial effect is particularly effective when the unevaporated EO fraction according to the invention derives from French lavender and is combined with a penicillin.

This invention also relates to the use of the fraction and the combinations according to the invention as medicament.

Within the framework of this invention, the fraction and the combinations according to the invention can also be used in cosmetics or can concern the sector of human or veterinary medicine.

This invention also relates to the use of the fraction and combinations according to the invention in the prevention or treatment of infectious diseases of bacterial or fungal origin, Preferably, the bacteria at the origin of the infectious disease is selected in the group constituted of the Staphylococcaceae family (e.g. *Staphylococcus aureus*), the Enterobacteriaceae family (e.g. *Escherichia, coli, Enterobacter aerogenes* and *Kiebsiella pneumoniae*), the Pseudomonodaceae family (e.g. *Pseudomonas aeruginosa*), the Mycobacteriaceae family (e.g. *Mycobacterium bovis*), the Enterococcaceae family (e.g. *Enterococcus faecalis*), the Helicobacteriaceae, family (e.g. *Helicobacter pylori*), the Streptococcaceae family (e.g. *Streptococcus mutans*), the Moraxellaceae family (e.g. *Acinetobucter baumannii*), the Clostridiaceae family (e.g. *Clostridium difficile*), the Spirochaetaceae family (e.g. *Borrelia garinii*) and their blends.

Preferably, the fungus at the origin of the infectious disease is *Candida albicans*. According to a preferred embodiment of the invention, the essential oil is previously extracted from French lavender and the bacterium is *S. aureus*.

These embodiments and other embodiments of this invention are indicated in the claims annexed.

Examples

The invention will now be described in greater detail in the following examples, which describe non-exhaustive embodiments of different aspects of this invention.

1. Method for Transforming Essential Oils (EO)

Commercial Efts (Pranarom) of ajowan (AW), exotic basil (BE), German chamomile (CA), Chinese cinnamon (CC), leaf coriander (CF), clove (GF), citronella (LG), French lavender (LS), compact marjoram (OC) and palmarosa (PM) were transformed according to the method of the invention. To do this, the EOs were prepared by adding 0.5 ml chloroform to 200 µL EO. The tubes were then placed in a Syncore® (Buchi) evaporator enabling controlled evaporation of 96 samples for a defined duration. The evaporation of the samples was undertaken at a pressure of 60 mbar, a temperature of 40'C, and under agitation of 250 rotations/minute.

2. Evolution of the Evaporation of the EOs Transformed According to Time

The evaporation of the EOs transformed according to the method of the invention as described above, according to the evaporation time, was measured and analysed by gas chromatography. The percentage of evaporation of the samples was measured after an evaporation of 3 hours (T1), 18 hours (T2), 24 hours (T3), 48 hours (T4) and 72 hours (T5). The results, expressed as evaporation percentages, are shown in tables 1 (for the least volatile EOs) and 2 (for the most volatile EOs).

TABLE 1

|    | T1  | T2  | T3  | T4  | T5   |
|----|-----|-----|-----|-----|------|
| CA | 1.4 | 3.3 | 4.6 | 5.4 | 7.6  |
| CC | 1.4 | 2.8 | 3.4 | 4.3 | 5.1  |
| GF | 0.7 | 1.3 | 1.8 | 2.8 | 3.3  |
| LG | 0.8 | 4.9 | 6.1 | 9.6 | 10.9 |
| PM | 0.8 | 1.8 | 2.1 | 3.2 | 3.5  |

Key: the results are expressed as percentages of evaporation

TABLE 2

|    | T1  | T2   | T3   | T4   | T5   |
|----|-----|------|------|------|------|
| AW | 8.0 | 23.0 | 23.8 | 48.3 | 52.4 |
| BE | 2.4 | 6.2  | 7.6  | 13.6 | 18.4 |
| CF | 5.4 | 9.9  | 12.8 | 18.3 | 22.9 |
| LS | 7.1 | 18.7 | 23.9 | 41.5 | 51.3 |
| OC | 6.5 | 15.3 | 15.8 | 24.4 | 27.4 |

Key: the results are expressed as percentages of evaporation

3. Individual and Combinatorial Activities of Unevaporated EO Fractions According to the Method of the Invention The individual activity of EOs transformed according to the method of the invention (EO-T) with an evaporation of 3 hours (T1), 18 hours (T2), 24 hours (T3), 48 hours (T4) and 72 hours (T5) was compared to the individual activity of the corresponding commercial FO not transformed according to the method of the invention (EO-C). The percentages of evaporation of each EO tested according to the evaporation time are presented in tables 1 and 2 above.

To do this, the stock solutions of EO (EO-C and EO-T) were first diluted in DMSO at the rate of 10 µl EO in 300 µl DMSO, They were agitated and stored at ambient temperature, away from the light, in glass tubes autoclaved with threaded cap. The individual activity of the EOs was measured by the microdilution method in a 96 well tray so as to obtain the MIC, value at which a solution inhibits bacterial growth. The bacterial strains treated were S. aureus LMG 15975 (methicillin-resistant Staphylococcus aureus, hereinafter referred to as MRSA÷), E. coli LMG 8223, E. coli LMG 15862, P. aeruginosa LMG 6395, S. aureus LMG 8064, S. aureus LMG 16217 (methicillin-resistant Staphylococcus aureus, hereinafter referred to as MRSA++), E. faecalis LMG 8222, K. pneumoniae LMG 20218 and E. aerogenes LMG 2094. Inocula of the bacterial strains were prepared by placing colonies of 18-24 hours of strains suspended in a sterile physiological solution (NaCl 0.85%). These inocula were then adjusted and diluted so as to obtain a final concentration of $5 \times 10^5$ CFU/ml. Concerning the test solutions, 300 µl of stock solutions of EO (diluted in DMSO) were added to 4.7 ml culture medium (for example to Mueller Hinton Broth), so as to obtain a solution of EO of 2 mg/ml which was then diluted in series by half in multi-well trays. The final percentage of DMSO in the wells is less than 5%. After inoculation, the multi-well trays were incubated for 18-24 hours at 37° C. and the presence of bacteria was viewed by adding methyl tetrazolium (MU).

The combinatorial activity makes it possible to determine whether the EO or the EO-T inhibits bacterial growth at a sub-MIC concentration, i.e. a concentration at which the EO does not have an individual activity. The sub-MIC concentration of an EO is equal to the minimum of two MICs (dilutions in series by half) below which the EO is active (individual activity). For example, if the MIC of a given EO is 500 µg/ml, the sub-MIC tested will be a minimum of 125 µg/ml. The values of sub-MIC are shown in column $EO_{sub-MIC}$.

The combinatorial activity of EOs transformed according to the method of the invention with an evaporation of 24 hours (EO-T3) and 72 hours (EO-T5) was compared with the combinatorial activity of the corresponding commercial EO not transformed according to the method of the invention (EO-C). The same method of microdilution as that used to determine the specific antibacterial activity was used to determine the combinatorial activity. The antibiotics tested in combination with the EOs transformed or not were amoxicillin (AMOX), penicillin G (PG), penicillin V (PV), celotaxime (CEFO), gentarnicin (GENTA), tetracycline (TETRA), doxycycline (DOXY) ampicillin (AMPI) and fosfomycin (FOSFO). The bacterial types treated were S. aureus LMG 15975 (MRSA+), S. aureus 16217 (MRSA++), E. faecalis LMG 8222, E. coli LMG 15862, P. aeruginosa LMG 6395, K. pneumoniae LMG 20218, and E. aerogenes LMG 2094. The difference lies in the fact that these are antibiotics which are diluted in series by half. The EOs, at theft sub-MIC concentration, were then added, and the solutions were inoculated with the aforementioned bacterial strains.

Results

The results concerning the individual activity are expressed in µg/ml and indicate the MIC of the ED when it is transformed or not according to the method of the invention. The results concerning the combinatorial activity are also expressed in µg/ml and indicate the sub-MIC values of the ED, alone or in combination with the antibiotic, transformed or not according to the method of the invention.

All in vitro tests were conducted as a minimum in triplicate on at least 3 different samples of an EO-T.

Table 3 shows the results of the individual and combinatorial activity in association with the PV of the EO-T according to the invention of AW, LS and DC on the strain S. aureus LMG 15975. The antibiotic is penicillin V (PV), of which the MIC on this strain is 4 µg/ml.

TABLE 3

| | | Reference strain: Staphylococcus aureus LMG 15975 | | |
|---|---|---|---|---|
| | | Individual activity | | Combinatorial activity |
| | % evaporation | MIC: PV/EO (µg/ml) | $EO_{sub-MIC}$ (µg/ml) | $EO_{sub-MIC}$ + PV (µg/ml) |
| PV    |      | 4     |      |       |
| AW-C  | 0    | 500   | 125  | 0.5   |
| AW-T3 | 23.8 | 500   | 125  | 0.125 |
| AW-T5 | 52.4 | 250   | 62.5 | 0.06  |
| LS-C  | 0    | >1000 | 500  | 0.06  |
| LS-T3 | 23.9 | 1000  | 250  | 0.06  |
| LS-T5 | 51.3 | 500   | 125  | 0.03  |
| OC-C  | 0    | 250   | 62.5 | 0.25  |
| OC-T3 | 15.8 | 250   | 62.5 | 0.125 |
| OC-T5 | 27.4 | 250   | 62.5 | 0.03  |

In the case of ajowan (AW), 50% of the least volatile constituents are present in the EO-T after 72 hours of evaporation. This transformation, called AW-TS, slightly increases the individual activity of the ajowan, which drops from an MIC of 500 µg/ml to an MIC of 250 µg/ml. In combinatorial activity, the ajowan not transformed (AW-C) increased the activity of the penicillin V by reducing its MIC, which falls from 4 µg/ml (PV alone) to 0.5 µg/ml (PV ¢ AW-C at 125 µg/ml), The combinatorial effect is even more effective with the EO-T of AW. Combined with the EO-T3 (24 hours of evaporation) and T5 (72 hours of evaporation), the MIC of the penicillin V falls to 0.125 µg/ml and to 0.06 µg/ml respectively in comparison to the MIC of penicillin V alone, which is 4 µg/ml.

In the case of French lavender (LS), the evaporation percentages are similar to those of ajowan, namely that at 72 hours (LS-TS) we also reach an evaporation of around 50% of the most volatile compounds. In individual activity, the MIC of LS-C, which was greater than 1000 µg/ml, reduces gradually to reach 500 µg/ml at 72 hours evaporation (LS-T5). In combinatorial activity, the EO-T5 increases the activity of the penicillin V: the MIC of the penicillin V, which alone is active at 4 µg/ml, reduces to 0.06 when associated with LS-C and LS-T3, and to 0.03 µg/mil when it is associated with EO-T5.

In the case of marjoram (OC), the transformations provoke an evaporation of the most volatile compounds of around 16% at 24 hours (OC-T3) and around 27% at 72 hours (OC-T5). The direct activity of the EO-T of OC is maintained at 250 kg/ml throughout the transformations (OC-73 and OC-T5). In combinatorial activity with penicillin V, the EO-T deriving from the transformation sharply reduced the MIC in comparison to that of commercial marjoram (OC-C): the MIC of penicillin V alone is 4 µg/ml and reduces to 0.25 µg/ml when associated with OC-C. The MIC of penicillin V reduces progressively to 0.125 µg/ml when it is associated with the OC-T3 extract, and reaches the concentration of 0.03 µg/ml when it is associated to OC-T5.

In all three cases, the association of EO-T5 (AW T5, LS T5 and OC-T5) with penicillin V makes it possible to descend to ranges of concentrations close to those obtained on the MSSA LMG 8064 strain (methicillin-resistant *Staphylococcus aureus*), of which the MIC of PV is 0.015 µg/ml. The EO-Ts according to the invention therefore have the capacity to re-establish the activity of the penicillin V on a strain having become resistant.

In conclusion, the method of transformation according to the invention makes it possible to obtain EO-Ts deriving from essential oils which have an increased antibacterial activity both in individual activity when the EO-1 is used alone and/or in combinatorial activity when the EO-T is combined with an antibiotic. This latter case is even more interesting since it would make it possible to reduce the doses of antibiotics to be administered by associating them to an EO-T of which the dose is not active per se.

Table 4 shows the results of the combinatorial activity in association with AMOX, PV and PG of EO-T according to the invention of LS on the strain *S. aureus* LMG 16217. The antibiotics are amoxicillin, of which the MIC on this strain is 64 penicillin G, of which the MIC on this strain is 64 µg/ml, and penicillin V, of which the MIC on this strain is 64

TABLE 4

| | Reference strain: *Staphylococcus aureus* LMG 16217 | | |
|---|---|---|---|
| | % evaporation | $EO_{sub-MIC}$ (µg/ml) | Combinatorial activity $EO_{sub-MIC}$ + AB (µg/ml) |
| AMOX | | | |
| LS-C | 0 | 500 | 32 |
| LS-T3 | 23.9 | 125 | 4 |
| LS-T5 | 51.3 | 125 | 4 |
| PV | | | |
| LS-C | 0 | 500 | 32 |
| LS-T3 | 23.9 | 125 | 4 |
| LS-T5 | 51.3 | 125 | 4 |
| PG | | | |
| LS-C | 0 | 500 | 32 |
| LS-T3 | 23.9 | 125 | 8 |
| LS-T5 | 51.3 | 125 | 8 |

Table 5 shows the results of the individual activity of the EO-T according to the invention of AW, CC, LG, OC and PM on the strain *Escherichia coli* LMG 15862.

TABLE 5

| | Reference strain: *Escherichia coli* LMG 15862 Individual activity | |
|---|---|---|
| | % evaporation | MIC: EO (µg/ml) |
| AW-C | 0 | 1000 |
| AW-T2 | 23 | 500 |
| AW-T3 | 23.8 | 500 |
| AW-T4 | 48.3 | 250 |
| CC-C | 0 | 500 |
| CC-T2 | 2.8 | 500 |
| CC-T3 | 3.4 | 250 |
| CC-T4 | 4.3 | 250 |
| LG-C | 0 | >1000 |
| LG-T2 | 4.9 | >1000 |
| LG-T3 | 6.1 | >1000 |
| LG-T4 | 9.6 | 1000 |
| OC-C | 0 | 500 |
| OC-T2 | 15.3 | 500 |
| OC-T3 | 15.8 | 250 |
| OC-T4 | 24.4 | 250 |
| PM-C | 0 | >1000 |
| PM-T2 | 1.8 | 1000 |
| PM-T3 | 2.1 | 1000 |
| PM-T4 | 3.2 | 1000 |

In all cases (AW, CC, LG, OC and PM), the individual activity increases when the EOs are transformed according to the method of the invention in comparison to the EOs not transformed (EO-C). Indeed, there is a general reduction observed in the MIC when the strain *E. coli* LMG 15862 is treated with the different EO-Ts (AW, CC, LG, OC and PM) transformed according to the method of the invention.

The invention claimed is:
1. A method for transforming an essential oil comprising:
  providing a previously extracted essential oil;
  evaporating a fraction of between 20 and 50% of the essential oil for at least 2 hours, under a pressure less than or equal to 500 mbar and at a temperature between 4° and 100° C.;
  obtaining a transformed essential oil comprising the recovery of the unevaporated essential oil fraction; and combining said transformed essential oil comprising the recovery of the unevaporated essential oil fraction with at least one antibiotic.

2. The method of transformation according to claim 1, wherein the evaporation is between 30 and 50%.

3. The method of transformation according to claim 1, wherein the evaporation is undertaken for a duration between 18 and 96 hours.

4. The method of transformation according to claim 1, wherein the evaporation is undertaken under a pressure less than or equal to 300 mbar.

5. The method of transformation according to claim 1, wherein the evaporation is undertaken at a temperature between 4° and 60° C.

6. The method of transformation according to claim 1, wherein the essential oil is previously extracted from French lavender or compact marjoram.

7. The method of transformation according to claim 1, wherein the essential oil is previously extracted from French lavender and in that the evaporation is undertaken for a duration between 24 and 96 hours, under a pressure between 25 and 75 mbar and at a temperature between 4° and 60° C.

8. A combination obtainable by the method of transformation according to claim 1, said combination comprising said transformed essential oil comprising the recovery of the unevaporated essential oil fraction and at least one antibiotic.

9. The combination according to claim 8, further comprising a second essential oil.

10. The combination according to claim 8, wherein the essential oil is previously extracted from French lavender and the antibiotic is a penicillin.

11. In a method of making a medicament using an essential oil, the improvement wherein the essential oil is the combination according to claim 8.

12. In a method for prevention or treatment of infectious diseases of bacterial origin using an essential oil, the improvement wherein the essential oil is the combination according to claim 8.

13. The method according to claim 12, wherein said essential oil is previously extracted from French lavender and the bacterium is *S. aureus*.

14. The combination according to claim 9, wherein the second essential oil is transformed by a method comprising:
  providing a previously extracted essential oil;
  evaporating a fraction of between 7 and 90% of the essential oil for at least 2 hours, under a pressure less than or equal to 500 mbar and at a temperature between 4° and 100° C.; and
  obtaining a transformed essential oil comprising the recovery of the unevaporated essential oil fraction.

\* \* \* \* \*